United States Patent
Wang et al.

(10) Patent No.: US 11,003,893 B2
(45) Date of Patent: *May 11, 2021

(54) FACE LOCATION TRACKING METHOD, APPARATUS, AND ELECTRONIC DEVICE

(71) Applicant: Advanced New Technologies Co., Ltd., Grand Cayman (KY)

(72) Inventors: Nan Wang, Hangzhou (CN); Zhijun Du, Hangzhou (CN); Yu Zhang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/925,072

(22) Filed: Jul. 9, 2020

(65) Prior Publication Data

US 2020/0342211 A1    Oct. 29, 2020

Related U.S. Application Data

(63) Continuation of application No. 16/561,918, filed on Sep. 5, 2019, now Pat. No. 10,713,472, which is a
(Continued)

(30) Foreign Application Priority Data

Nov. 12, 2015  (CN) .......................... 201510772348.7

(51) Int. Cl.
   *G06K 9/00*    (2006.01)
   *G06K 9/62*    (2006.01)
   (Continued)

(52) U.S. Cl.
   CPC .......... *G06K 9/00261* (2013.01); *G06F 17/11* (2013.01); *G06K 9/62* (2013.01);
   (Continued)

(58) Field of Classification Search
   None
   See application file for complete search history.

(56) References Cited

U.S. PATENT DOCUMENTS 10,410,046 B2   9/2019  Wang et al.
10,713,472 B2   7/2020  Wang et al.
(Continued)

FOREIGN PATENT DOCUMENTS

CN   101231703   7/2008
CN   101527838   9/2009
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Sean M Conner
(74) *Attorney, Agent, or Firm* — Fish & Richardson P.C.

(57) ABSTRACT

A first face region within a first image is determined. The first face region includes a location of a face within the first image. Based on the determined first face region within the first image, a predicted face region within a second image is determined. A first region of similarity within the predicted face region is determined. The first region of similarity has at least a predetermined degree of similarity to the first face region within the first image. Whether a second face region is present within the second image is determined. The location of the face within the second image is determined based on the first region of similarity, the determination of whether the second face region is present within the second image, and a face region selection rule.

18 Claims, 11 Drawing Sheets

Related U.S. Application Data continuation of application No. 15/977,576, filed on May 11, 2018, now Pat. No. 10,410,046, which is a continuation of application No. PCT/CN2016/104491, filed on Nov. 4, 2016.

(51) Int. Cl.
*G06T 7/20* (2017.01)
*G06T 7/223* (2017.01)
*G06F 17/11* (2006.01)

(52) U.S. Cl.
CPC .............. *G06K 9/6215* (2013.01); *G06T 7/20* (2013.01); *G06T 7/223* (2017.01)

(56) References Cited

U.S. PATENT DOCUMENTS

| | | | |
|---|---|---|---|
| 2004/0228505 | A1 | 11/2004 | Sugimoto |
| 2006/0204036 | A1 | 9/2006 | Huang |
| 2008/0080739 | A1 | 4/2008 | Muramatsu |
| 2010/0007758 | A1 | 1/2010 | Abe et al. |
| 2013/0236068 | A1 | 9/2013 | Eshghi et al. |
| 2014/0286527 | A1 | 9/2014 | Harthattu et al. |
| 2014/0328514 | A1 | 11/2014 | Sugio |
| 2019/0392199 | A1 | 12/2019 | Wang et al. |

FOREIGN PATENT DOCUMENTS

| | | |
|---|---|---|
| CN | 102054159 | 5/2011 |
| CN | 102306290 | 1/2012 |
| CN | 103279751 | 9/2013 |
| CN | 103902960 | 7/2014 |
| CN | 104318211 | 1/2015 |
| CN | 104794439 | 7/2015 |
| JP | 2008217714 | 9/2008 |
| JP | 2009104284 | 5/2009 |
| JP | 2010021943 | 1/2010 |
| JP | 2010141616 | 6/2010 |
| JP | 2010191784 | 9/2010 |
| JP | 2011170711 | 9/2011 |
| JP | 2013210824 | 10/2013 |
| JP | 2015114917 | 6/2015 |

OTHER PUBLICATIONS

European Extended Search Report in European Application No. 16863576.1, dated Oct. 18, 2018, 9 pages.

Fan et al., "Dynamic multiple faces detection and real-time tracking method in complex environment," Application Research of Computers, Oct. 2015, 32(10):3183-3186 (with English abstract).

Human-Computer Nature Interaction, 1st ed., National Defence Industry Press (ed)., Jan. 2004, Chapter 6.6.1, 9 pages (with Machine translation).

International Search Report issued by the International Searching Authority in International Application No. PCT/CN2016/104491 dated Feb. 7, 2017; 6 pages (with English translation).

Jain et al., "Multi-feature Hierarchical Template Matching using Distance Transforms," Proceedings 14th International Conference on Brisbane, Aug. 1998, 1:439-444.

Mohammed et al., "Efficient Face Tracking and Detection in Video: Based on Template Matching," Proceedings of the International Conference on Image Processing, Computer Vision, and Pattern Recognition (IPCV), 2012, 8 pages.

Nakamoto, "Bitcoin: A Peer-to-Peer Electronic Cash System," www.bitcoin.org, 2005, 9 pages.

PCT International Preliminary Report on Patentability in International Application No. PCT/CN2016/104491, dated May 15, 2018, 12 pages (with English translation).

PCT Written Opinion of the International Searching Authority in International Application No. PCTCN2016104491, dated Feb. 7, 2017, 11 pages (with English translation).

Viola et al., "Robust Real-Time Face Detection," International Journal of Computer Vision, 2004, 57(2):137-154.

Written Opinion in Singaporean Patent Application No. 11201803990Y, dated Jan. 2, 2019, 7 pages.

FACE LOCATION TRACKING METHOD, APPARATUS, AND ELECTRONIC DEVICE

This application is a continuation of U.S. patent application Ser. No. 16/561,918, filed on Sep. 5, 2019, which is a continuation of U.S. patent application Ser. No. 15/977,576, filed on May 11, 2018, which is a continuation of PCT Application No. PCT/CN2016/104491, filed on Nov. 4, 2016, which claims priority to Chinese Patent Application No. 201510772348.7, filed on Nov. 12, 2015, and each application is hereby incorporated by reference in its entirety.

TECHNICAL FIELD

The present application relates to the field of image information data processing, and in particular, to a face location tracking method, apparatus, and electronic device.

BACKGROUND

Face tracking is usually a process of determining the face's movement and change of size in a video or an image sequence. Face tracking plays an important role and is widely used in image analysis and recognition, image monitoring and retrieval, instant video communication, etc.

Generally, the face tracking processing can mainly include identifying a face location in a video. During video recording, when a face moves, a specific algorithm such as a particle shift or a mean shift can be used to track the specific location of the face in the video. Currently, face tracking method processing used in the existing technology mainly include: performing face detection on each image frame, that is, each frame can be considered as a separate image, and then face detection is performed on each image frame, so as to obtain a face location in each image frame by calculation. However, in actual implementations, for example, in a process in which a user uses a front-facing camera of a mobile phone to take a selfie, a face tracking loss or a detection error is usually caused due to a sudden light or scene change, strong light or metering interference, rapid face movement, etc. Consequently, tracked face images are usually discontinuous in a user video monitoring process or a video call process, and a real-time smooth tracking effect cannot be achieved, thereby greatly compromising user experience, especially in a terminal device with relatively poor processing performance. Certainly, the face tracking method in the existing technology cannot meet a relatively high face-tracking requirement of a user.

For the face tracking methods in the existing technology, a face tracking loss or an error occurs especially in a complex scenario such as a sudden light change, light interference, or rapid face movement, which can result in a blurred face image or discontinuous tracked face images in a video. The effectiveness of face detection and tracking, and user experience may be compromised.

SUMMARY

The present application provides a face location tracking method, apparatus, and electronic device, so that a face region in an image frame can be accurately located in a complex scenario such as a sudden light change, light interference, or rapid face movement, to improve effectiveness of face tracking. In addition, face tracking loss can be avoided, thereby improving face location tracking efficiency and user experience.

A face location tracking method, apparatus, and electronic device provided in the present application are implemented as follows:

A face location tracking method is provided, and the method includes: obtaining a face region in a current image frame; determining a predicted region that includes a face in a next image frame of the current image frame based on the face region in the current image frame; searching the predicted region for a first preselected region with similarity to the face region that meets a predetermined requirement; and detecting a face region in the next image frame, and determining a face location tracking result of the next image frame based on the first preselected region, a result of detecting the face region in the next image frame, and a predetermined selection rule.

A face location tracking apparatus is provided, and the apparatus includes: a detection module, configured to detect a face region in a current image frame; a predicted region calculation module, configured to calculate a predicted region that includes a face in a next image frame of the current image frame based on the face region that is in the current image frame and that is detected by the detection module; a preselected region calculation module, configured to search the predicted region for a first preselected region with similarity to the face region that meets a predetermined requirement; and a tracking result selection module, configured to determine a face location tracking result of the next image frame based on the first preselected region, a result of detecting a face region in the next image frame of the current image frame by the detection module, and a predetermined selection rule.

A face location tracking electronic device is provided, and the electronic device includes: an information acquisition unit, configured to obtain a current image frame waiting to be processed; a processing unit, configured to: detect a face region in the current image frame; calculate a predicted region that includes a face in a next image frame of the current image frame based on the detected face region in the current image frame, and search the predicted region for a first preselected region with similarity to the face region that meets a predetermined requirement; and determine a face location tracking result of the next image frame based on the first preselected region, a result of detecting a face region in the next image frame of the current image frame by the processing unit, and a predetermined selection rule; and a display unit, configured to display the face location tracking result obtained by the processing unit.

In the face location tracking method, apparatus, and electronic device provided in the present application, a range of the predicted region that includes a face in the next image frame can be predicted based on the face region in the current image frame. Then, a preselected region of a face region with similarity to a face region in a previous image frame that meets a predetermined requirement (for example, the highest similarity) can be found within the range of the predicted region. As such, information about a preselected face can be obtained from the next image frame of the current frame based on the previous image frame. Further, in the solutions in the present application, the face region in the next image frame can be detected. If no face region is detected from the next image frame, a preselected region obtained by means of calculation based on the previous image frame can be used as the face region in the next image frame. If the face region can be detected, the next image frame includes at least two face regions, and a face region that meets the requirement can be selected as the final face location tracking result of the next image frame based on the predetermined selection rule. Therefore, in the present application, even if no face region is detected from the current image frame due to a complex scenario such as a sudden light change, a face location can be located and tracked by using a preselected region obtained by prediction based on a face region in the previous image frame. As such, continuity of face detection and tracking can be ensured, face detection and tracking can be more effective, and user experience of face tracking can be improved.

BRIEF DESCRIPTION OF DRAWINGS

To describe the technical solutions in the implementations of the present application or in the prior art more clearly, the following briefly introduces the accompanying drawings used for describing the implementations or existing technology. Apparently, the accompanying drawings in the following description merely show some implementations of the present application, and a person of ordinary skill in the art may still derive other drawings from these accompanying drawings without creative efforts.

DESCRIPTION OF EMBODIMENTS

To make a person skilled in the art understand the technical solutions in the present application better, the following clearly and completely describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
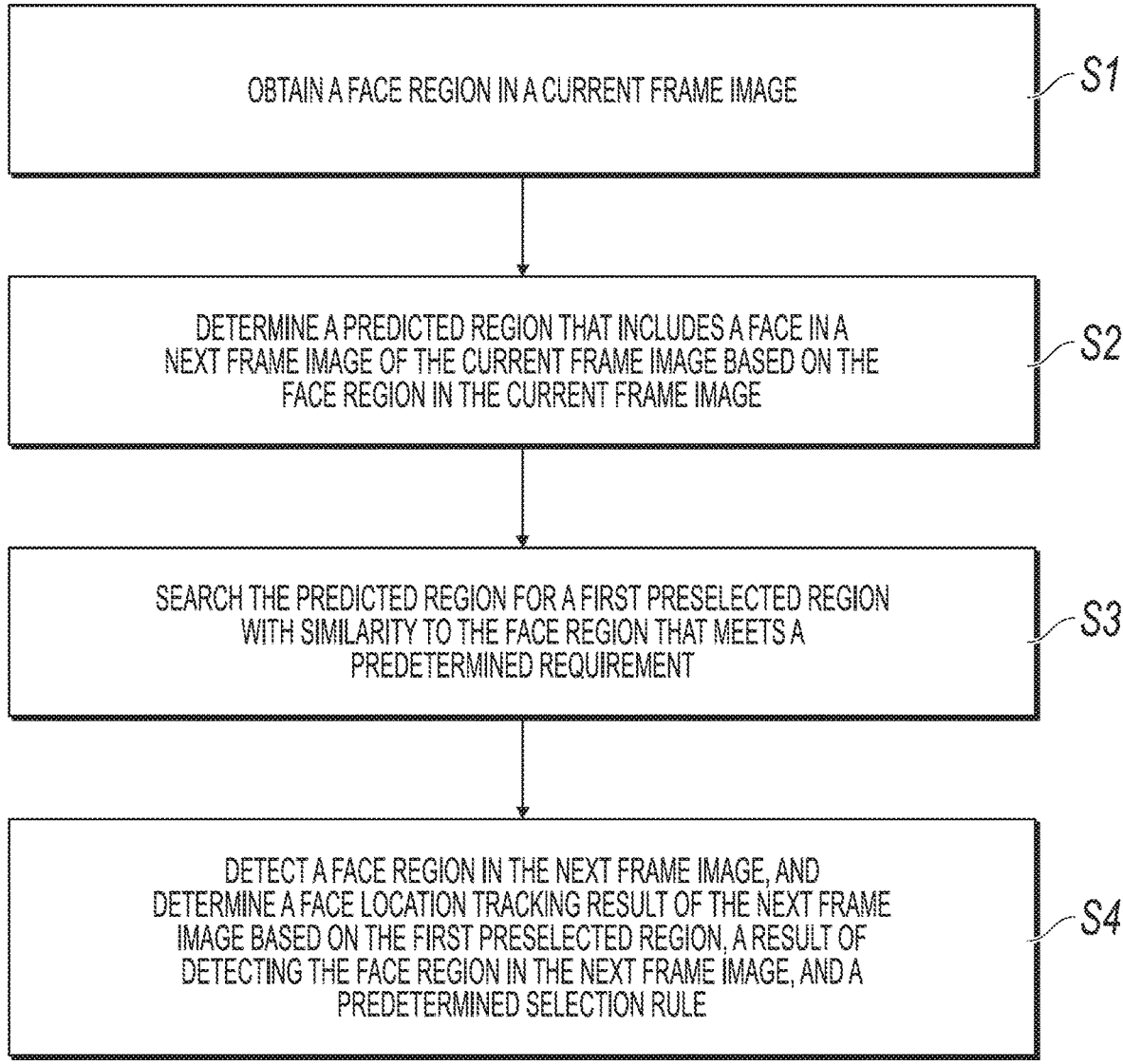
FIG. 1 is a method flowchart illustrating a face location tracking method, according to an implementation of the present application.

The following describes in detail a basic data processing method in the present application with reference to the accompanying drawings. FIG. 1 is a method flowchart illustrating a face location tracking method, according to an implementation of the present application. Although the present application provides the operation steps of the method in the following implementations or accompanying drawings, the method can include more or fewer operation steps based on a conventional or non-creative effort. In a step in which there is no necessary causal relationship in logic, an execution sequence of these steps is not limited to an execution sequence provided in the implementations of the present application. When the method is executed by an apparatus or a terminal product in actual application, the method can be executed based on the sequence of the method in the implementations or accompanying drawings or can be executed in parallel (for example, a parallel processor or a multi-thread processing environment).

Specifically, as shown in FIG. 1, the present application provides an implementation of a face location tracking method, and the method can include the following steps.

S1: Obtain a face region in a current image frame.

Generally, face location tracking is mainly used in video stream information processing recorded by a camera apparatus, for example, a monitoring device, or a camera of a user's mobile phone. The face location tracking method provided in the present application can include but is not limited to video stream information processing, and the solution in the present application can still be used for face tracking of consecutive images or cine film digital information in other application scenarios. To clearly describe the solution in the present application, this implementation can be described by using an application scenario in which a user uses a front-facing camera of a mobile phone to take a selfie. In this implementation, a face region in a current image frame of a current video can be obtained first. Specifically, face detection can be performed on a video image frame at the beginning of a video stream. Generally, face detection is performed on each image frame until a face is detected. Generally, when a face is detected from the current image frame, information related to the face image can be obtained, such as an image color parameter, an image size, and a frame distance. Face location can usually be represented by a specific region. For example, a rectangular box can usually be used to represent a region in which a face is detected.

In a terminal product application scenario where data processing capability of a mobile communications terminal or a vehicle dashboard video recorder is lower than a data processing capability of a personal computer (PC), the present application can provide an implementation of detecting a face region. In an implementation, the obtaining a face region in a current image frame can include: detecting and obtaining the face region in the current image frame by using an Adaboost method for reducing a quantity of classification levels.

Adaboost is an iterative algorithm. The primary process of Adaboost includes training different classifiers (weak classifiers) for a same training set, and combining the weak classifiers into a stronger final classifier (strong classifier). The Adaboost algorithm can usually be used to determine a weighted value of each sample based on whether classification of each sample in each training set is correct and the accuracy of a previous overall classification. Then, a new data set whose weighted value has been modified can be sent to a next-layer classifier for training, and classifiers obtained during each training are combined into a final decision classifier. A classifier in an Adaboost cascade structure is usually composed of a series of serial classifiers. When determining samples to be identified, only a sample determined as positive by a classifier at a previous level is sent to a next classifier for further processing. Otherwise, a negative sample is directly rejected. In the cascade structure, previous classifiers are simpler in structure, use less feature data, but have a higher detection rate. Negative samples greatly different from a target object can be filtered out as much as possible. Subsequent classifiers use more feature data and have a more complex structure, so that negative samples similar to the target object can be distinguished from the target object.

It should be noted that in this implementation, in a process that the face region in the current image frame is detected by using the Adaboost method, a quantity of classification levels can be appropriately reduced as needed, so as to reduce calculation complexity in face detection and perform rapid face detection.

In an implementation of the face location tracking method in the present application, when a user performs active photographing by using a front-facing camera or a rear-facing camera of a mobile phone, if more than one person is photographed, a proportion of a main photographed face on a screen or a display is usually large. In this case, a face closest to the camera can be a main target. Therefore, to more accurately track a face location and meet a user's face location tracking expectation, in another implementation of the present application, only the face closest to the camera may be tracked during face location tracking. In an example process, the largest face region in the current image frame can be selected as a face tracking object. Therefore, in another implementation of the present application, the obtaining a face region in a current image frame can include: when at least two faces are detected from the current image frame, selecting a region corresponding to a face with the largest area in the current image frame as the face region in the current image frame.

In this implementation, the face region in the current image frame of the video can be obtained.

S2: Determine a predicted region that includes a face in a next image frame of the current image frame based on the face region in the current image frame.

Figure 2:
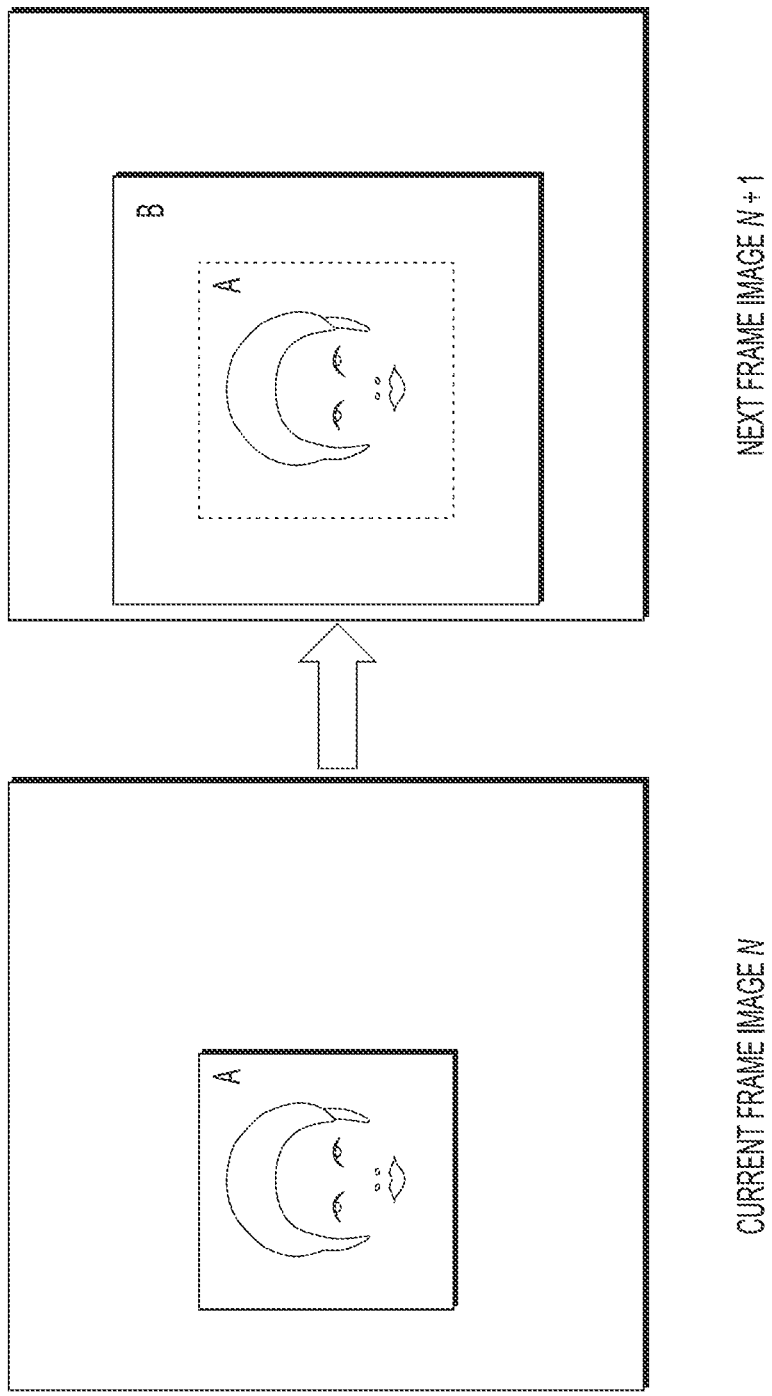
FIG. 2 is a schematic diagram illustrating determining a predicted region that includes a face in a next image frame based on a face region in a current image frame.

After the face region in the current image frame is obtained, the predicted region that includes a face in the next image frame can be determined based on the face region in the current image frame. The predicted region can include a range of a face region determined in the next image frame of the current image frame based on a specific algorithm or rule. FIG. 2 is a schematic diagram illustrating determining a predicted region that includes a face in a next image frame based on a face region in a current image frame. As shown in FIG. 2, in the current image frame N, a rectangular box A is a detected face region in the current image frame. In a next image frame N+1, a rectangular box B obtained after a length and a width of the rectangular box A of the face region in the previous image frame N (that is, the current image frame N) are separately expanded by K pixels is used as a predicted region that includes a face in the next image frame N+1. In another implementation, the predicted region can be determined by using another method. For example, a rectangular box obtained after the length and the width of the rectangular box A of the face region in the current image frame are separately expanded by 1.5 times can be used as the predicted region.

The predicted region that includes a face in the next image frame of the current image frame is determined based on the face region in the current image frame and a specific rule.

S3: Search the predicted region for a first preselected region with similarity to the face region that meets a predetermined requirement.

After the predicted region that may include a face in the next image frame is determined, the first preselected region with high similarity to the face region can be searched and matched within the range of the predicted region. The face region can be obtained from the previous image frame (that is, the current image frame N in S2).

In this implementation, a template matching method can be provided to calculate similarity between the face region and the first preselected region in the next image frame. In an implementation process, the face region in the current image frame can be used as an original template, and a boundary of the face region can be set as a moving window. A new matching template can be obtained during each window movement. Within the range of the predicted region, each time the predicted region moves by one step, data of a new moving window region can be obtained, and similarity between the moving window region and the face region is calculated. In the present application, calculating or determining similarity between two regions is not limited to a specific method, and other methods that can implement the same or similar function can be applied to the present application. Specifically, the determining a predicted region that includes a face in a next image frame of the current image frame based on the face region in the current image frame can include:

S301: Traverse the predicted region based on a first step size to obtain a comparison region of the face region.

The first step size can be set based on a processing speed or a processing precision requirement in actual face location tracking. In an optional implementation, the data calculation amount can be reduced to improve the data processing speed, and a face location tracking accuracy requirement can be ensured. In this implementation, a value range of the first moving step can be greater than or equal to two pixels.

S302: Calculate similarity between the face region and the comparison region.

A corresponding calculation method and a corresponding calculation parameter can be selected to calculate similarity between different image regions based on different application scenarios or different data processing requirements. For example, the similarity between the face region and the comparison region can be calculated based on an image color, an image texture, or an image gradient of different regions. The present application provides an implementation of calculating the similarity. Specifically, in an implementation of the present application, the similarity, denoted as dis, between the face region and the comparison region can be calculated by using the following equations:

$$\min X = \max(-left_{ori}, -left_{des})$$
$$\max X = \max(width - left_{ori}, width - left_{des})$$
$$\min Y = \max(-top_{ori}, -top_{des})$$
$$\max Y = \max(height - top_{ori}, height - top_{des})$$

-continued $$SumDis = \left\{ \sum_{i=max(1,minX)}^{min(width,max X)} \sum_{j=max(1,minY)}^{min(height,max X)} \min\{|f(i, j) - g(i, j)|, x\} \right\}$$

$$effctiveNum = [\min(width, \max X) - \max(1, \min X)] *$$

$$[\min(height, \max X) - \max(1, \min Y)]$$

$$dis = sumDis * (width * height) / effctiveNum$$

In the above equations $left_{ori}$, $left_{des}$, $top_{ori}$, and $top_{des}$ can respectively represent a left boundary location of the face region, a left boundary location of a current comparison region, an upper boundary location of the face region, and an upper boundary location of the current comparison region. The variable width can represent a width of the face region, height can represent a height of the face region, f(i,j) can represent a grayscale value of a pixel whose coordinates are (i,j) in the face region in the current image frame (that is, a frame K preceding a next frame K+1), g(i,j) can represent a grayscale value of a pixel whose coordinates are (i,j) in a comparison region in the next image frame, x can represent a specified empirical threshold, and dis is the similarity between the face region and the comparison region. In the above equations, max (a, b) can represent that a larger value between a and b is selected, and min (a, b) can represent that a smaller value between a and b is selected.

S303: Use a comparison region with similarity that meets the predetermined requirement in the next image frame as the first preselected region in the next image frame.

In this implementation, the predetermined requirement may be set and can be used to select a comparison region that meets a prediction requirement in the predicted region. For example, the predetermined requirement may be set as follows: the similarity between the comparison region and the face region is more than 90% or a comparison region within a percentage is specified after similarity sorting. For example, the first three highest-similarity comparison regions. In an optional implementation of the present application, the comparison region with similarity that meets the predetermined requirement can include: a comparison region with the largest similarity among comparison regions in the next image frame.

Figure 3:
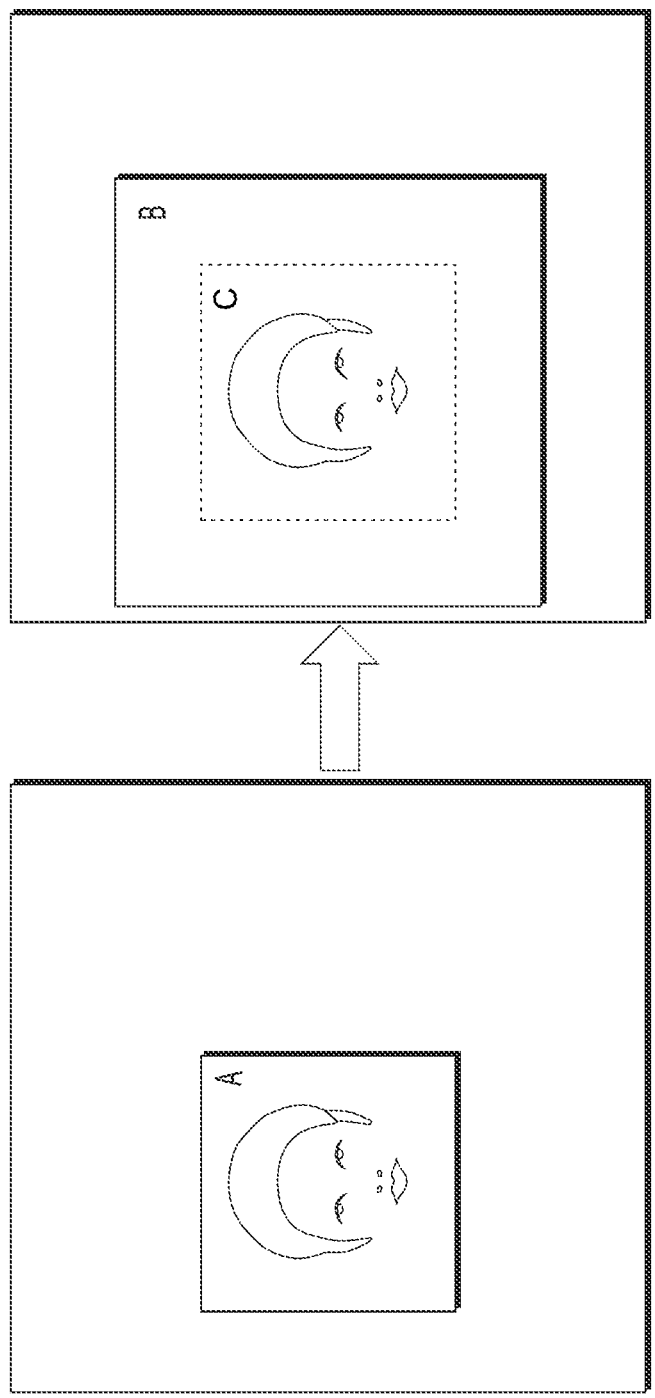
FIG. 3 is a schematic diagram illustrating searching a predicted region for a first preselected region, according to the present application.

FIG. 3 is a schematic diagram illustrating searching a predicted region for a first preselected region, according to the present application. As shown in FIG. 3, in a predicted region B of the next image frame N+1, a first preselected region C with similarity to the face region A in the current image frame N that meets the requirement can be found. In this implementation, only a region that is in a next-frame comparison region and with the highest similarity to the face region in the current image frame can be selected as the first preselected region. In this case, in comparison with selecting multiple preselected regions, a data processing amount can be reduced, a preselected region can be selected faster, and a face location processing speed can be improved.

In this implementation, when the template matching method is used to calculate the first preselected region, addition and subtraction can be performed on a grayscale value of a pixel within a specific region. In comparison with another existing tracking algorithm, there is no need to perform massive processing and storage, and time complexity and space complexity are low. The application of this implementation is broader, especially for mid-low end mobile phone and monitoring device with weak information data processing capability. Therefore, the calculation amount can be effectively reduced and face tracking precision can be improved. In addition, in a face tracking environment of short-distance video recording, for example, in an application scenario of a front-facing camera of a mobile phone, a proportion of the face in a screen is usually large when a user takes a selfie. In the template matching method in this implementation, effective information of a face region in a larger proportion of the video screen can be obtained, and a tracking result can be more reliable in comparison with other tracking algorithms.

In this implementation, the first preselected region with similarity to the face region that meets the predetermined requirement can be searched for in the predicted region by using a specific calculation method.

S4: Detect a face region in the next image frame, and determine a face location tracking result of the next image frame based on the first preselected region, a result of detecting the face region in the next image frame, and a predetermined selection rule.

When the current image frame is switched to the next image frame, it can be detected whether a face region exists in the next image frame. If a face region is detected from the next image frame, at least two face regions are obtained from the next-image frame, that is, the detected face region and the first preselected region obtained based on face tracking prediction. In the present application, the final face tracking result of the next image frame can be obtained by particular collaborative calculation and analysis based on the at least two face regions.

In the present application, the predetermined selection rule can be used to determine which face region is used as the final face location tracking result. The selection rule in this implementation can include a selection rule for selecting the face region in the next image frame or the first preselected region according to a percentage of an overlap area between the face region in the next image frame and the first preselected region in either the face region in the next image frame or the first preselected region. In this implementation, the percentage of the overlap area between the face region and the first preselected region in the face region of the next image frame or the first preselected region can be defined as an overlap coefficient Q.

Figure 4:
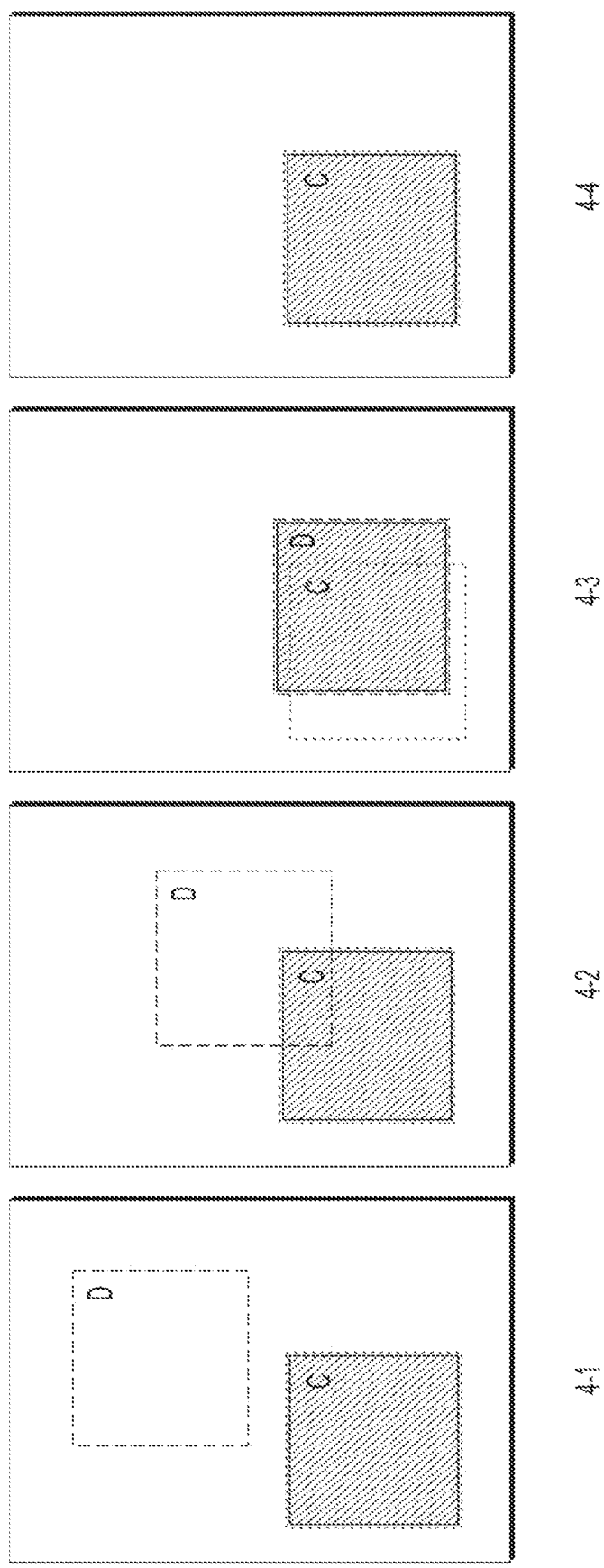
FIG. 4 is a schematic diagram illustrating a selection scenario of determining a face location tracking result, according to the present application.

FIG. 4 is a schematic diagram illustrating a selection scenario of determining a face location tracking result, according to the present application. As shown in FIG. 4, a rectangular box D can represent the detected face region in the next image frame, and is referred to as a detection result here. A rectangular box C can represent the first preselected region in the next image frame and obtained by tracking calculation in steps S1 to S3 or another implementation, and is referred to as a tracking result here. The shaded area is the final determined face location tracking result of the next image frame. When both the detection result and the tracking result exist in the next image frame, if the detection result does not overlap with the tracking result, that is, the overlap coefficient Q is 0, the tracking result can be used as the face location tracking result, as shown in 4-1 in FIG. 4. If there is an overlap region between the detection result and the tracking result, but an overlap area is relatively small and does not meet a specified overlap requirement, the tracking result can be used as the face location tracking result, as shown in 4-2 in FIG. 4. In another case, if there is an overlap region between the detection result and the tracking result, and an overlap area is large and meets a specified overlap requirement, for example, 95% of the regions are overlapped, the detection result can be selected as the face location tracking result, as shown in 4-3 in FIG. 4. If no face region is detected from the next image frame, the tracking result can be directly used as the face location tracking result, as shown in 4-4 in FIG. 4.

Therefore, in an optional implementation, determining a face location tracking result of the next image frame based on detecting the face region in the next image frame and a predetermined selection rule can include: when the result of detecting the face region in the next image frame is that no face region is detected, using the first preselected region as the face location tracking result of the next image frame; when a coefficient of an overlap between the detected face region in the next image frame and the first preselected region is 0, use the first preselected region as the face location tracking result of the next image frame; when the coefficient of the overlap between the detected face region in the next image frame and the first preselected region is less than a predetermined threshold, use the first preselected region as the face location tracking result of the next image frame; or when the coefficient of the overlap between the detected face region in the next image frame and the first preselected region is greater than or equal to the predetermined threshold, use the detected face region in the next image frame as the face location tracking result of the next image frame.

This implementation provides an implementation method for selecting the final face location tracking result from the detection result and the tracking result. In this implementation of the present application, a face location can be accurately and rapidly tracked in a complex environment such as rapid face movement, a sudden light change, or strong light interference. In the implementation, when a frame loss occurs in an image frame and no face is detected, a face location can still be tracked and determined, so that a continuous tracking effect of the face location can be implemented, and face tracking can be smooth. Even if a frame loss does not occur, a more suitable region can be selected between a detection result and a tracking result in an image frame based on a predetermined selection rule as a face location tracking result, so as to improve effectiveness of face tracking effect and user experience.

It should be noted that a current frame, a next frame, a previous frame, a frame preceding the previous frame in the present application can be considered as relative concepts for describing an image frame information processing object in actual applications. If an image frame at a moment in a video stream can be marked as a current image frame N, a corresponding next frame may be an (N+1)th image frame, and a previous frame may be an (N−1)th image frame. After tracking on the (N+1)th image frame is completed, a face location in an (N+2)th image frame can be further tracked and processed. In this case, the current image frame is the (N+1)th image frame, and correspondingly, a next image frame of the current image frame N+1 may be the (N+2)th image frame.

During continuous image frame processing, after tracking processing on a face location in a current image frame is completed, a face location in a next image frame can be further tracked by using a processing result of the current image frame as reference information or initialization information for tracking the face location in the next image frame. In some application scenarios, a quantity of image frames that need to be processed per second in the video stream may usually be more than a dozen frames or even dozens of frames. During face location tracking, if no face is detected because of a face tracking loss in frame N caused by a sudden light change or rapid face movement, a face region obtained from the result of detecting or processing a previous frame N−1 can be used as a face region tracked from frame N where the face tracking loss occurs. In a related implementation, if in addition, no face is detected or tracked from the previous frame N−1, a face region result obtained by detecting or processing a frame N−2 can still be used, and so on. If no face is detected in multiple consecutive frames based on a predetermined determining rule, it can be determined that the face is not captured in the video recording range.

In the above implementation, when the predicted region that includes a face is searched for in the next image frame, a value of the first step size can be determined as needed. For example, the predicted region can be moved by two pixels or five pixels each time. Generally, a larger step size can indicate a faster speed of searching for a region that is similar to a previous image frame face region, and less data needs to be processed. A smaller step size can indicate higher search accuracy. In an implementation in which the value range of the first moving step is greater than or equal to two pixels, to further improve accuracy of searching the first preselected region, in another implementation provided in the present application, the method can further include:

S304: Search for a second preselected region with the highest similarity to the face region within a range of a second step size surrounding the first preselected region, where the second step size is less than the first step size. In this case, the second preselected region obtained by means of precise searching can be used as the face location region tracking result of the next image frame. Either of the detection result and the second preselected region may be subsequently determined as the final face location tracking result.

Correspondingly, the determining a face location tracking result of the next image frame based on the first preselected region, a result of detecting the face region in the next image frame, and a predetermined selection rule includes: determining the face location tracking result of the next image frame based on the second preselected region, the result of detecting the face region in the next image frame, and the predetermined selection rule.

Figure 5:
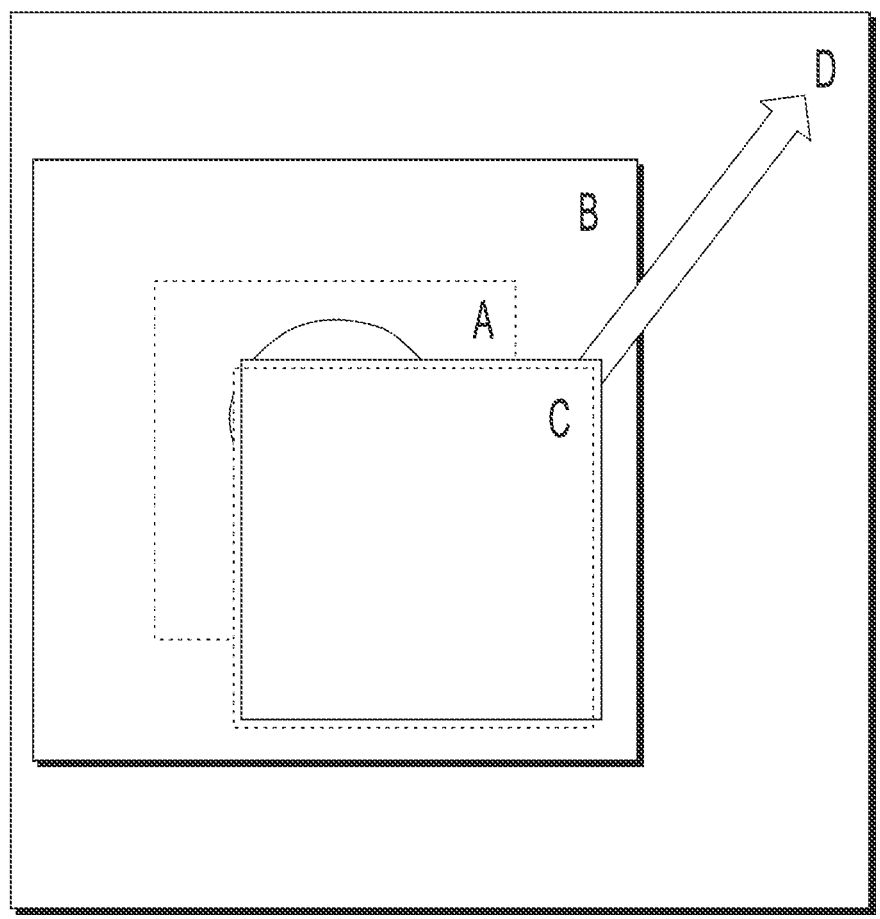
FIG. 5 is a schematic diagram illustrating further searching for a second preselected region, according to an implementation of the present application.

In specific application, for example, the first step is two pixels, similarity between a face region within a range of a pixel surrounding the first preselected region and the face region in the previous image frame may be calculated in this implementation, so as to obtain a region with the highest similarity. Specifically, in this implementation, the second preselected region can be calculated by using the similarity calculation method in step S302. Other calculation methods for determining similarity between two regions are not excluded. Details for those calculation methods are not described here. FIG. 5 is a schematic diagram illustrating further searching for a second preselected region, according to an implementation of the present application. As shown in FIG. 5, a rectangular box C is a first preselected region of a face region that is determined by using two pixels as the step size of a predicted region, and a rectangular box D is a comparison region C_ru of an upper right pixel of the first preselected region C. Certainly, a range of a pixel surrounding the first preselected region can include a comparison region C_d formed by moving the first preselected region downward by one pixel, a comparison region C_u formed by moving the first preselected region upward by one pixel, a comparison region C_ld formed by moving the first preselected region towards the lower left corner by one pixel, and so on. Then, the similarity between the comparison region of a pixel surrounding the first preselected region and the face region can be calculated, and a comparison region with the highest similarity can be selected as the second preselected region.

In this implementation, the first preselected region is calculated by setting a relatively large first step size, so as to effectively reduce the calculation amount in image comparison and searching to improve data processing speed of face location tracking. In this implementation, based on the result of the first preselected region, more accurate search can be performed nearby using the second step size smaller than the first step size, to obtain the second preselected region that has more accurate tracking result. As such, rapid searching can be implemented, and accuracy of face tracking can be improved, thereby improving effectiveness of face tracking.

Figure 6:
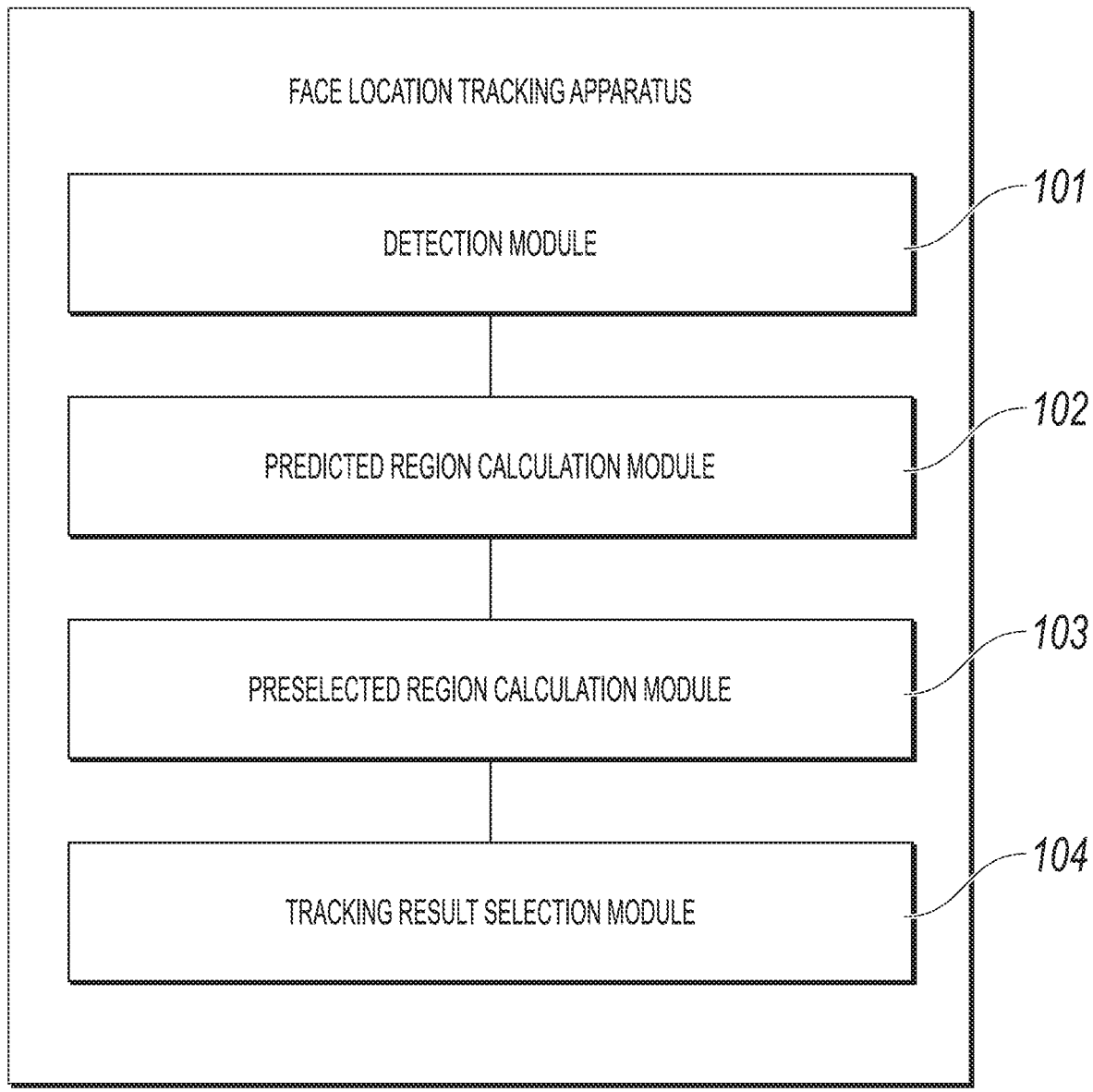
FIG. 6 is a schematic diagram illustrating a module structure of a face location tracking apparatus, according to an implementation of the present application.

Based on the face location tracking method in the present application, the present application provides a face location tracking apparatus. FIG. 6 is a schematic diagram illustrating a module structure of a face location tracking apparatus, according to an implementation of the present application. As shown in FIG. 6, the apparatus can include: a detection module 101, configured to detect a face region in a current image frame; a predicted region calculation module 102, configured to calculate a predicted region that includes a face in a next image frame of the current image frame based on the face region that is in the current image frame and that is detected by the detection module 101; a preselected region calculation module 103, configured to search the predicted region for a first preselected region with similarity to the face region that meets a predetermined requirement; and a tracking result selection module 104, configured to determine a face location tracking result of the next image frame based on the first preselected region, a result of detecting a face region in the next image frame of the current image frame by the detection module 101, and a predetermined selection rule.

In the implementation of the face location tracking apparatus in the present application, the detection module 101 can continuously detect, over time, a face region in an image frame obtained by a camera apparatus. For example, 15 frames of video images are shot per second in a video stream, and a face region in a current frame (an Nth frame) of image can be detected during face location tracking. After detection and tracking processing on information data of the current frame (the Nth frame) of image is completed, a face region in a next frame (an (N+1)th frame) of image can be further detected.

In an implementation of the detection module 101 of the apparatus in the present application, the face region in the current image frame can be detected and obtained by using an Adaboost method for reducing a quantity of classification levels. As such, a data calculation amount during face detection can be reduced, and a positioning and processing speed of face location tracking can be improved.

In another implementation of the apparatus in the present application, only a face closest to a camera can be tracked during face location tracking processing. In an implementation process, the largest face region in the current image frame can be selected as a face tracking object. Therefore, in another implementation of the apparatus in the present application, that the detection module 101 detects a face region in a current image frame includes: when at least two faces are detected from the current image frame, selecting a region corresponding to a face with the largest area in the current image frame as the face region in the current image frame.

Figure 7:
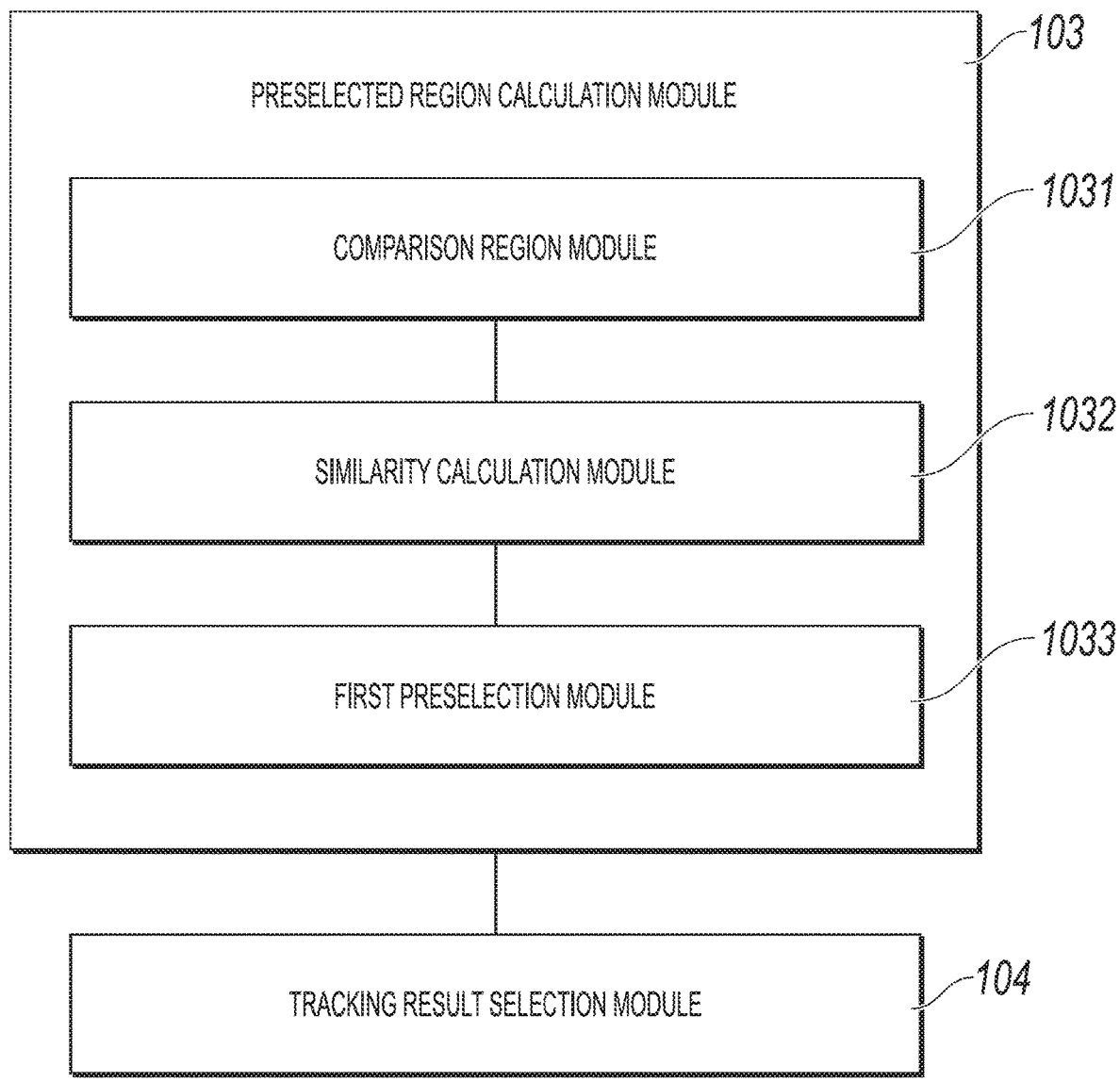
FIG. 7 is a schematic diagram illustrating a module structure of a preselected region calculation module, according to an implementation of the present application.

The present application is not limited to a method of searching for the first preselected region by the preselected region calculation module 103 based on calculation. FIG. 7 is a schematic diagram illustrating a module structure of a preselected region calculation module 103 of the apparatus, according to an implementation of the present application. As shown in FIG. 7, the preselected region calculation module 103 can include a comparison region module 1031, a similarity calculation module 1032, and a first preselection module 1033.

The comparison region module 1031 is configured to traverse the predicted region based on a specified first step to obtain a comparison region of the face region.

The similarity calculation module 1032 is configured to calculate similarity between the face region and the comparison region.

In an implementation of the apparatus in the present application, the similarity calculation module 1032 can calculate the similarity dis between the face region and the comparison region by using the following equations:

$$\min X = \max(-left_{ori}, -left_{des})$$

$$\max X = \max(\text{width} - left_{ori}, \text{width} - left_{des})$$

$$\min Y = \max(-top_{ori}, -top_{des})$$

$$\max Y = \max(\text{height} - top_{ori}, \text{height} - top_{des})$$

$$SumDis = \left\{ \sum_{i=\max(1,\min X)}^{\min(\text{width},\max X)} \sum_{j=\max(1,\min Y)}^{\min(\text{height},\max X)} \min\{|f(i,j) - g(i,j)|, x\} \right\}$$

$$effctiveNum = [\min(\text{width}, \max X) - \max(1, \min X)] *$$

$$[\min(\text{height}, \max X) - \max(1, \min Y)]$$

$$dis = sumDis * (\text{width} * \text{height}) / effctiveNum$$

In the above equations, $left_{ori}$, $left_{des}$, $top_{ori}$, and $top_{des}$ respectively represent a left boundary location of the face region, a left boundary location of a current comparison region, an upper boundary location of the face region, and an upper boundary location of the current comparison region. The variable width represents a width of the face region, height represents a height of the face region, f(i,j) represents a grayscale value of a pixel whose coordinates are (i,j) in the face region in the current image frame, and g(i,j) represents a grayscale value of a pixel whose coordinates are (i,j) in a comparison region in the next image frame; and x represents a specified empirical threshold, and dis is the similarity between the face region and the comparison region.

The first preselection module 1033 is configured to use a comparison region with similarity that meets the predetermined requirement in the next image frame as the first preselected region in the next image frame.

The equations used by the similarity calculation module 1032 included in the apparatus can be implemented in a specific implementation process on the apparatus/module by using a computer readable program language such as, for example, a C language, or can be implemented in a form of hardware and software using certain hardware structure as needed.

In an optional implementation, the predetermined requirement specified by the first preselection module 1033 may be set with the highest similarity to the face region. Therefore, in another implementation, the comparison region with similarity that meets the predetermined requirement in the first preselection module 1033 can include: a comparison region with the largest similarity among comparison regions in the next image frame.

In the above implementation, the first step specified by the comparison region module 1031 can be set according to a requirement for a processing speed or processing accuracy of the face location tracking apparatus in the present application. In an implementation of the apparatus in the present application, a value range of the first step size can be set to be greater than or equal to two pixels.

Figure 8:
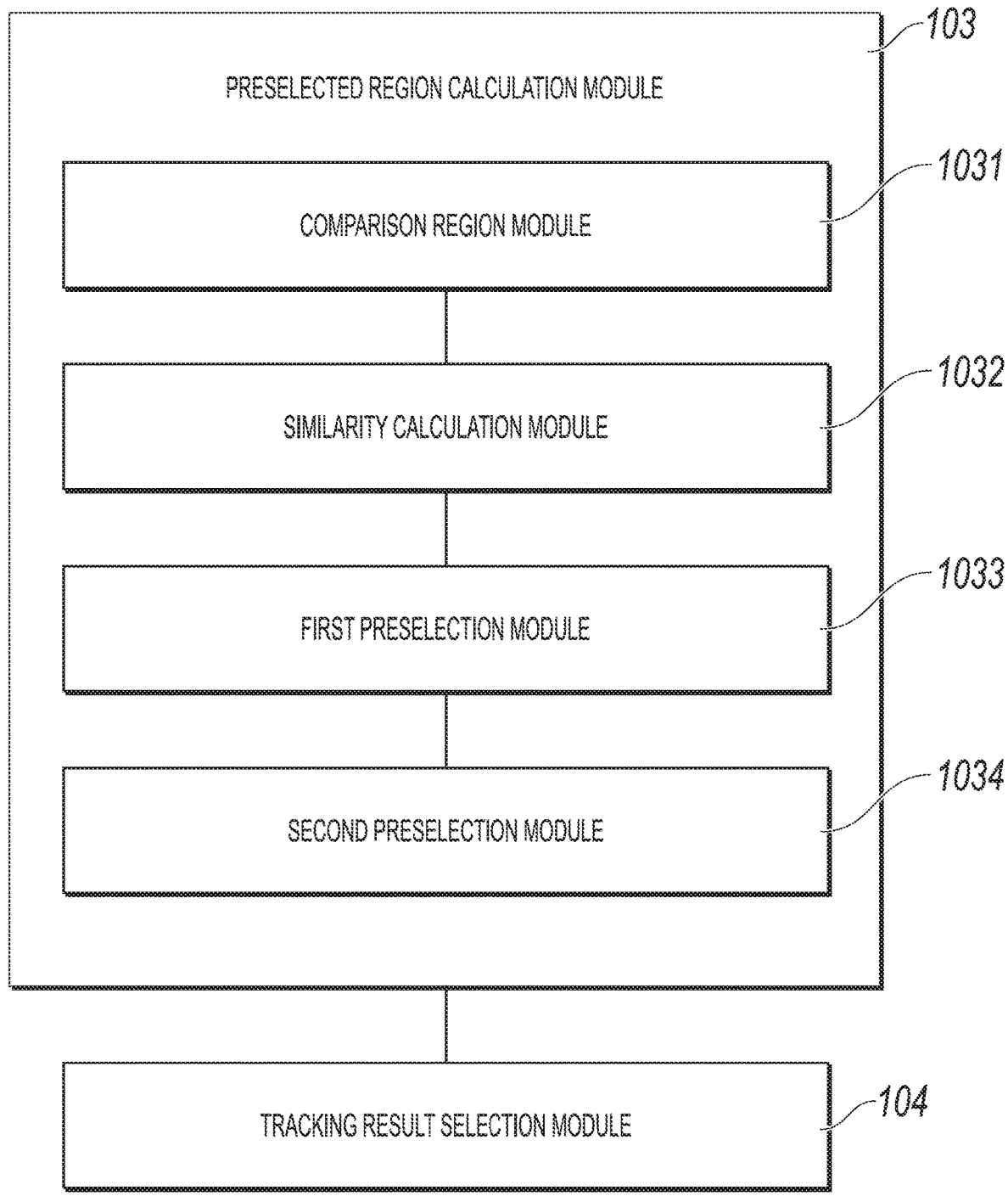
FIG. 8 is a schematic diagram illustrating a module structure of a preselected region calculation module, according to another implementation of the present application.

The present application can further provide an implementation of the face location tracking apparatus. FIG. 8 is a schematic diagram illustrating a module structure of a preselected region calculation module, according to another implementation of the present application. As shown in FIG. 8, the preselected region calculation module 103 can further include: a second preselection module 1034, configured to search for a second preselected region with the highest similarity to the face region within a range of a second step size surrounding the first preselected region, where the second step size is less than the first step size.

Correspondingly, the tracking result selection module 104 determines a face location tracking result of the next image frame based on the first preselected region, a result of detecting a face region in the next image frame of the current image frame by the detection module 101, and a predetermined selection rule includes: the tracking result selection module 104 determines the face location tracking result of the next image frame based on the second preselected region, the result of detecting the face region in the next image frame of the current image frame by the detection module 101, and the predetermined selection rule.

In the face location tracking apparatus in this implementation, based on the result of the first preselected region, more precise searching can be performed within the range of the second step size and smaller than the first step size, and the second preselected region with a more accurate tracking result is obtained. As such, rapid searching processing can be implemented, and accuracy of face location tracking can be improved, thereby improving the effectiveness of face tracking.

Figure 9:
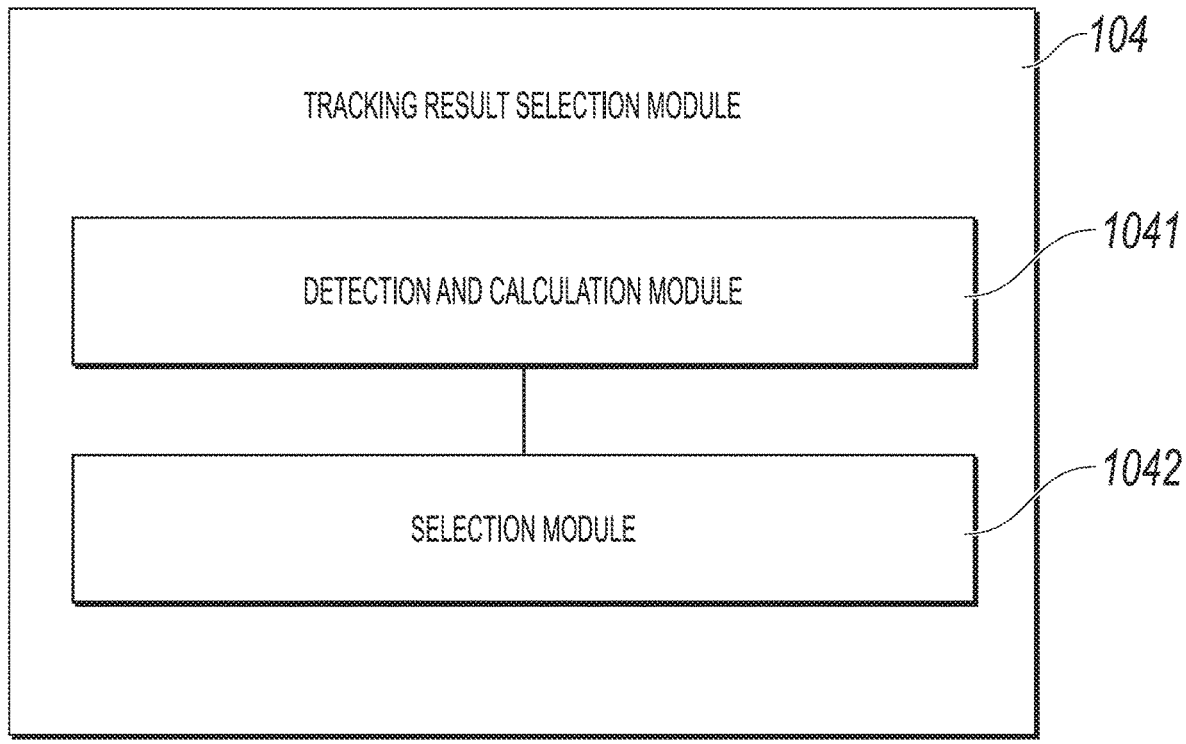
FIG. 9 is a schematic diagram illustrating a module structure of a tracking result selection module, according to an implementation of the present application.

FIG. 9 is a schematic diagram illustrating a module structure of a tracking result selection module 104, according to an implementation of the present application. As shown in FIG. 9, the tracking result selection module 104 can include a detection and calculation module 1041 and a selection module 1042.

The detection and calculation module 1041 is configured to: detect the face region in the next image frame, and calculate a coefficient Q of an overlap between the face region of the next image frame and the first preselected region when the face region in the next image frame is detected. In this implementation, the overlap coefficient Q can be represented as a percentage of an overlap area between the face region in the next image frame and the first preselected region in either the face region or the first preselected region.

The selection module 1042 is configured to use the first preselected region as the face location tracking result of the next image frame, when at least one of the following conditions is met: no face region is detected by the detection and calculation module 1041 from the next image frame; the overlap coefficient calculated by the detection and calculation module 1041 is 0; or the overlap coefficient calculated by the detection and calculation module 1041 is less than a predetermined threshold. Alternatively, or additionally, the selection module 1042 is configured to use the face region that is in the next image frame and that is detected by the detection module 101 as the face location tracking result of the next image frame, when the overlap coefficient calculated by the detection and calculation module 1041 is greater than or equal to the predetermined threshold.

This implementation provides a solution for selecting a final face location tracking result from a detection result and a tracking result. In this implementation of the present application, a face location can be accurately and rapidly tracked in a complex environment such as rapid face movement, a sudden light change, or strong light interference. In this implementation, when a frame loss occurs in an image frame and no face is detected, a face location can still be tracked and determined, so that a continuous tracking effect of the face location can be implemented to ensure smooth face tracking. Even if a frame loss does not occur, a more suitable region can be selected between a detection result and a tracking result in an image frame as a face location tracking result is based on a predetermined selection rule, so as to improve effectiveness of face tracking and user experience.

Figure 10:
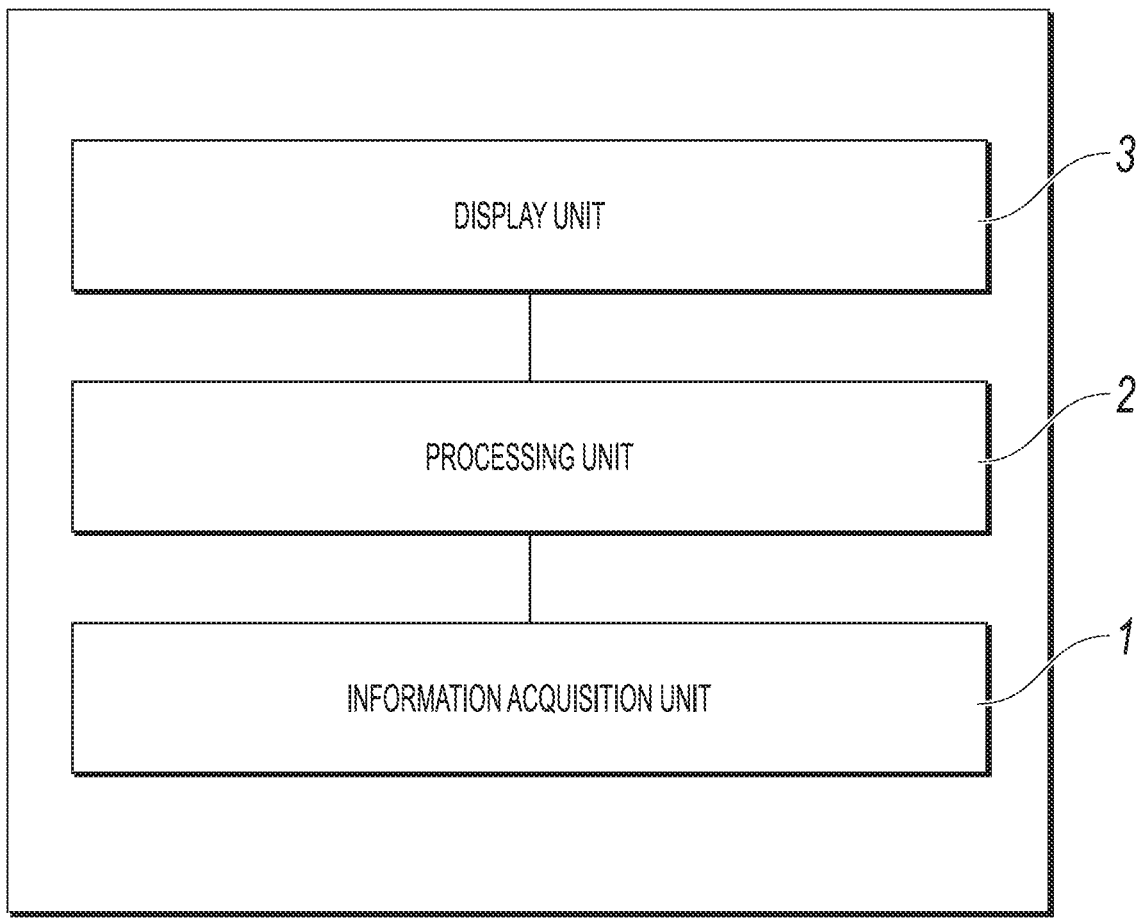
FIG. 10 is a schematic structural diagram illustrating a face location tracking electronic apparatus, according to an implementation of the present application.

The face location tracking method or apparatus in the present application can be applied to multiple terminal devices to perform more rapid, accurate, and fluent face location tracking. For example, such devices can include a video camera device, a monitoring device, and a face location tracking device for consecutive image frames of a mobile communications terminal based on an Android system or an iOS system. Therefore, the present application further provides a face location tracking electronic device, and the electronic device can include a camera apparatus for detecting and obtaining a video image frame, a display for video playback, a processing unit for information data processing, etc. Specifically, FIG. 10 is a schematic structural diagram illustrating a face location tracking electronic apparatus, according to an implementation of the present application. As shown in FIG. 10, the electronic device can include: an information acquisition unit 1, configured to obtain a current image frame waiting to be processed; a processing unit 2, configured to: detect a face region in the current image frame; calculate a predicted region that includes a face in a next image frame of the current image frame based on the detected face region in the current image frame, and search the predicted region for a first preselected region with similarity to the face region that meets a predetermined requirement; and determine a face location tracking result of the next image frame based on the first preselected region, a result of detecting a face region in the next image frame of the current image frame by the processing unit, and a predetermined selection rule; and a display unit 3, configured to display the face location tracking result obtained by the processing unit 2.

The information acquisition unit 1 in the electronic device in the present application can include a front-facing camera, a rear-facing camera, or a monitoring camera apparatus of a mobile terminal. In another application scenario, an implementation in which a computer processes image information data that is obtained in real time or has been previously obtained is also included, for example, the computer performs face location tracking processing on video information. The processing unit 2 can include a central processing unit (CPU), which can further include a single-chip microcomputer with a logic processing capability, a logic gate circuit, an integrated circuit, etc. The display unit 3 can generally include a display, a mobile terminal display screen, a projection device, etc.

Although the face detection method, data processing such as data exchange between module units, and information display are described in the content of the present application, the present application is not limited to the data processing and the information display mentioned in the standard or the implementations. The above description in the implementations of the present application is merely application of some implementations of the present application, and a processing method slightly modified based on some standards and methods can also be used to implement the solutions in the implementations of the present application. Certainly, other non-creative changes in accordance with steps of the processing method in the implementations of the present application can still be used to implement the same application. Details are not described here.

Although the present application provides the operation steps of the method in the implementations or flowcharts, the method can include more or fewer operation steps based on a conventional or non-creative effort. A sequence of the steps enumerated in the implementations is merely one of execution sequences of the steps, and does not represent a unique execution sequence. When the method is executed by an apparatus or a client product in actual application, the method can be executed based on the sequence of the method in the implementations or accompanying drawings or can be executed in parallel (for example, a parallel processor or a multi-thread processing environment).

The units or modules described in the above implementations can be specifically implemented by a computer chip or an entity, or implemented by a product with a certain function. For ease of description, the above apparatus and device are described by using various modules and various units. Certainly, during implementation of the present application, functions of multiple modules can be implemented in one or more pieces of software and/or hardware, for example, a first preselection module and a second preselection module, or modules that implement a same function can be implemented by using a combination of multiple sub-modules or subunits.

A person skilled in the art also knows that, in addition to implementing a controller by using a computer readable program code, logic programming can be performed on the method steps to enable the controller to implement a same function in forms of a logic gate, a switch, a dedicated integrated circuit, a programmable logic controller, and an embedded microcontroller. Therefore, the controller can be considered as a hardware component, and an apparatus that is included in the controller and that is used to implement various functions can also be considered as a structure in the hardware component. Furthermore, an apparatus for implementing various functions can be even considered as both a software module for implementing the method and the structure in the hardware component.

The present application can be described in a general context of a computer executable instruction executed by a computer, such as a C language, or a program module based on an Android design platform or an iOS design platform. Generally, the program module includes a routine, a program, an object, a component, a data structure, a type, or the like that executes a specific task or implements a specific abstract data type. The present application can also be applied to a distributed computing environment in which a task is executed by a remote processing device that is connected by using a communications network. In the distributed computing environment, the program module can be located in local and remote computer storage media including a storage device.

It can be learned from description of the above implementations that, a person skilled in the art can clearly understand that the present application can be implemented by using software in addition to a necessary universal hardware platform. Based on such an understanding, the technical solutions in the present application essentially or the part contributing to the prior art can be implemented in a form of a software product. The software product can be stored in a storage medium, such as a ROM/RAM, a magnetic disk, or an optical disc, and includes several instructions for instructing a computer device (which can be a personal computer, a mobile terminal, a server, or a network device) to perform the methods described in the implementations or in some parts of the implementations of the present application.

The implementations in this specification are all described in a progressive manner. For same or similar parts in the implementations, reference can be made to these implementations, and each implementation focuses on a difference from other implementations. The present application can be applied to many general-purpose or dedicated computer system environments or configurations, for example, a personal computer, a server computer, a handheld device or a portable device, a tablet device, a mobile communications terminal, a multiprocessor system, a microprocessor system, a programmable electronic device, a network PC, a small computer, a mainframe computer, and a distributed computing environment including any of the above systems or devices.

Although the present application is depicted by using the implementations, a person of ordinary skill in the art knows that the present application has many variations and changes without departing from the spirit of the present application, and the appended claims include these variations and changes without departing from the spirit of the present application.

Figure 11:
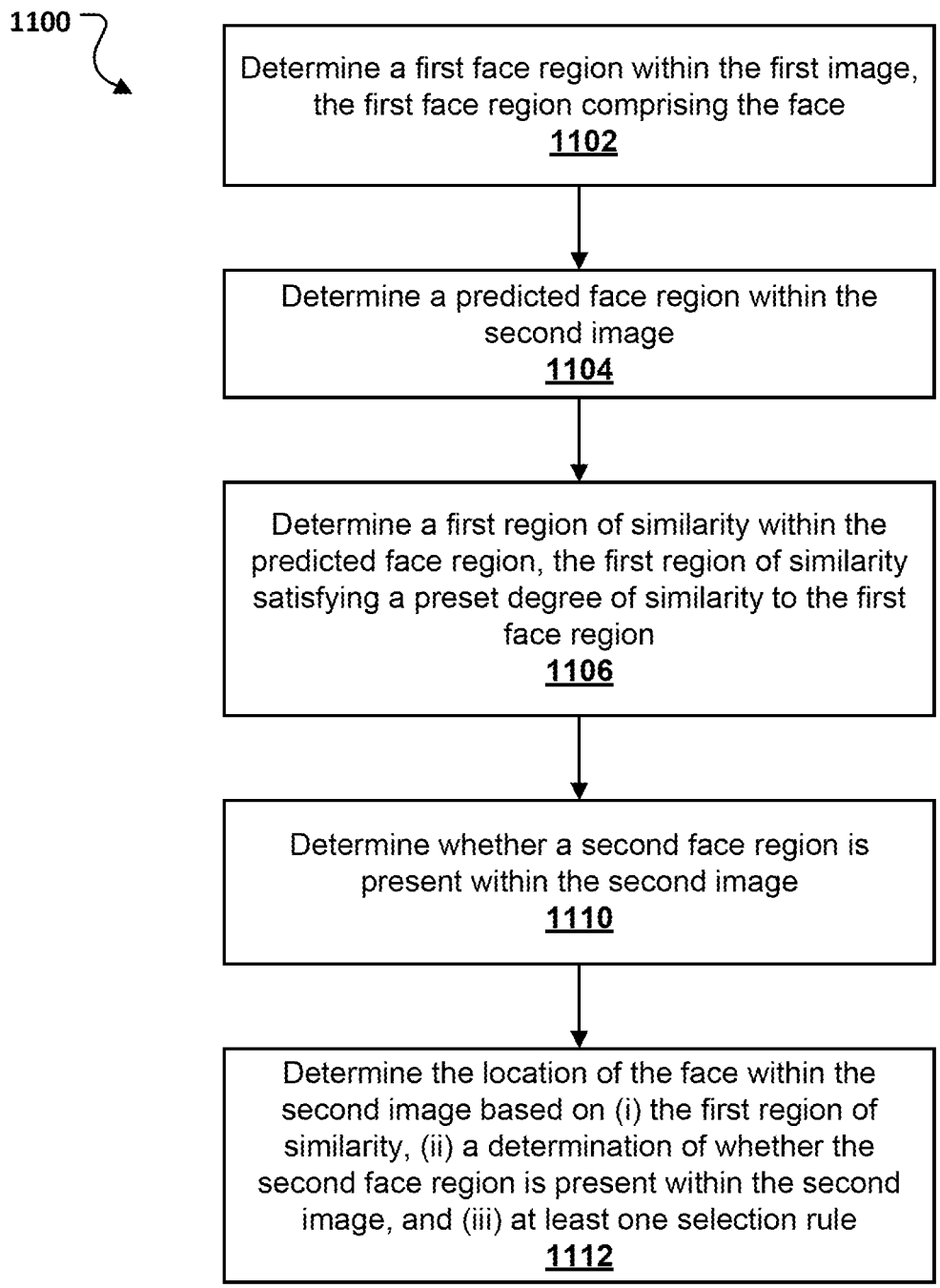
FIG. 11 is a flowchart illustrating an example of a computer-implemented method for tracking a location of a face across a plurality of images, according to an implementation of the present disclosure.

FIG. 11 is a flowchart illustrating an example of a computer-implemented method 1100 for tracking a location of a face across a plurality of images, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

Digital videos can be formed by arranging a plurality of images in a sequence. The individual images of the sequence may be referred to as image frames. The method 1100 refers to a first image and a second image, which may be a part of a digital video stream. For example, the first image may be an Nth frame of the video, and the second image may be an (N+1)th frame.

At 1102, a first face region within the first image is determined. The first face region includes a face that is to be tracked across a plurality of images. This step may be similar to the step S1 of FIG. 1. The determination of the first face region may be performed in various ways, including, for example, running a face recognition algorithm, or performing the Adaboost method. Examples of the first face region include the face region A of FIG. 2, which is the detected face region in the Nth frame.

In some scenarios, the first image may contain a plurality of faces. In such scenarios, it may be desirable to track the location of one of the plurality of faces that is closest to the camera taking the video. For example, when capturing a video through a front-facing camera of a phone, the holder of the phone is typically located closest to the camera, and the holder of the phone is typically a primary person of interest whose face should be tracked for various purposes, such as applying an augmented reality effect. As such, in some implementations, determining the first face region within the first image may include the steps of: determining that the first image comprises a plurality of faces; determining a plurality of face region areas; and determining a region comprising a face of the plurality of faces having the largest face region area to be the first face region.

The determination that the first image comprises a plurality of faces may be performed in a manner similar to the determination of the first face region. For example, by running a face recognition algorithm on the first image containing multiple faces, multiple face regions corresponding to the locations of the plurality of faces may be generated.

Each of the multiple face regions has a corresponding face region area. For example, for a face region that encloses one of the faces contained in the first image, the face region area may be calculated as a total number of pixels contained within the face region. Based on the calculated face region areas, the face region having the largest face region area, and hence likely to be the closest to the camera, may be determined to be the first face region. From 1102, method 1100 proceeds to 1104.

At 1104, a predicted face region within the second image is determined based on the first face region of 1102. The predicted face region may be a region within the second image that is predicted, or likely, to include the face being tracked in the first image. This step may be similar to the step S2 of FIG. 1. For example, the center of the predicted face region may coincide with the center of the first face region, and the dimensions of the predicted face region may be determined, for example, by a scaling factor greater than 1 (e.g., scale width and height of the first face region by a constant factor k1 greater than 1).

In general, when the second image is an image frame that immediately follows the first image, the time elapsed between the first image and the second image may be short, e.g., $\frac{1}{24}^{th}$, $\frac{1}{30}^{th}$, or $\frac{1}{60}^{th}$ of a second. Given the short duration of time elapsed between subsequent frames of a video, an estimated range of face location change may be determined by taking into account various geometrical and human factors such as a typical size of a face, an estimated distance between the camera and the face, and maximum speed of human movement. As such, in some implementations, the dimensions of the predicted face region may be determined through experimentation or through computer modeling to determine appropriate dimensions of the predicted face region.

In some implementations, a trend in movement of the face across previous frames of a video may be used to determine the location of the predicted face region. For example, if the face has moved from the (N−1)th frame to the Nth frame by K pixels (e.g., 10 pixels) in a certain direction (e.g., in an upward direction), the center of the predicted face region for the (N+1)th frame may be shifted by the same K pixels (e.g., 10 pixels) in the same direction (e.g., in the upward direction) to account for the expected movement of the face based on inertia. From 1104, method 1100 proceeds to 1106.

At 1106, a first region of similarity within the predicted face region is determined. The first region of similarity satisfies a preset degree of similarity to the first face region. This step may be similar to the step S3 of FIG. 1. Various comparison algorithm can be used to compare a sub region of the predicted face region to the first face region containing the face being tracked to determine which sub regions of the predicted face region of the second image is similar to the first face region. In some implementations, a mathematical transformation, such as an Affine transformation, may be included in the comparison algorithm to account for orientation and scaling of the face, for example.

In some implementations, determining the first region of similarity within the predicted face region may include the steps of: setting a first comparison region within the predicted face region; determining a first degree of similarity between the first comparison region and the first face region; determining that the first degree of similarity satisfies the preset degree of similarity; and based on the determination that the first degree of similarity satisfies the preset degree of similarity, determining the first comparison region to be the first region of similarity.

Setting the first comparison region within the predicted face region may be done in various ways. For example, a region having identical dimensions as the first face region may be placed within the extents of the predicted face region.

The first degree of similarity between the first comparison region and the first face region may be determined in various ways. For example, pixel-based comparison algorithms or block-based comparison algorithms may be used. As an example of a pixel-based comparison algorithm, the previously described equations of step S302 may be computed. While a greyscale values of the pixels of the first and second images are used in this example calculation, in some implementations, the comparison may further take into account the colors of the pixels. Block-based comparison algorithm may partition the first comparison region and the first face region into blocks of pixels, and the respective blocks of pixels may be compared for similarity. For example, the greyscale or color values of the pixels within a block may be averaged to generate a representative value for the block, and the representative value may be compared for similarity. Block-based comparison algorithms may be advantageous over pixel-based algorithms when the pixel count of an image is large (e.g., FHD, QHD, or UHD images) as computation burden of the comparison algorithm may be reduced by a factor proportional to the block size. Further, a face may be oversampled in high resolution images, and use of block-based comparison may not result in appreciable loss in detail of the face being tracked.

Determining that the first degree of similarity satisfies the preset degree of similarity may be performed in various ways. For example, the preset degree of similarity may be a number, a percentage, or a fraction. For example, the preset degree may be an experimentally determined value, 90%, or 0.9. In general, the preset degree of similarity may be tuned based on desired performance of the face location tracking method. For example, in applications where only an approximate location of the face is needed, the preset degree of similarity may be lowered.

In general, a comparison region is smaller than the predicted face region. In some cases, more than one comparison region may satisfy the preset degree of similarity. As such, in some implementations, determining the first region of similarity within the predicted face region may further include the steps of: setting a second comparison region within the predicted face region, the second comparison region being different from the first comparison region; determining a second degree of similarity between the second comparison region and the first face region; and determining that the second degree of similarity satisfies the preset degree of similarity. In this case, both the first and second comparison regions satisfy the preset degree of similarity. To resolve situations in which multiple comparison regions satisfy the preset degree of similarity, in some implementations, determining the first comparison region to be the first region of similarity may include: determining that the first degree of similarity is greater than the second degree of similarity; and based on the determination that the first degree of similarity is greater than the second degree of similarity, determining the first comparison region to be the first region of similarity. By choosing a comparison region with the highest degree of similarity to be the first face region, face tracking accuracy may be improved relative to choosing a first instance of the comparison region that satisfies the preset degree of similarity.

To cover the entire predicted face region, the steps of 1106 may be repeated for different comparison regions until a degree of similarity to the first face region has been calculated across the entire predicted face region. One way of covering, or traversing, the entire predicted face region during the determination of the first region of similarity is by systematically translating, or "stepping," a comparison region by a fixed step from one extent of the predicted face region to the other extent. As such, in some implementations, determining the first region of similarity within the predicted face region may further include: setting a second comparison region within the predicted face region by translating the first comparison region by a first step, the first step being two or more pixels of the second image. The first step may be set in various ways. For example, the first step may be a set number of pixels, e.g., 5, 10, 20, 40, or 100 pixels. As another example, the first step may be set as a fraction of the number of pixels along the width or height of an image, such as 1%, 2%, 5%, or 10% of the width or height. As yet another example, the first step may be set as a fraction of the width or height of the predicted face region such as 1%, 2%, 5%, or 10% of the width or height. As a further example, the first step may be set such that the entire predicted face region is traversed using a preset number of comparison regions. From 1106, method 1100 may proceed to 1110.

In cases where the comparison regions are translated by a fixed step greater than or equal to two pixels, the location of the first region of similarity is determined with a resolution down to the size of the first step. In some scenarios, it may be advantageous to further refine the location of the first region of similarity. For example, a local search around the first region of similarity may be performed by stepping a comparison region about the first region of similarity using a step size of 1 pixel. As such, in some implementations, the method 1100 may include determining a second region of similarity within the predicted face region based on the determination of the first region of similarity within the predicted face region. The determination of the second region of similarity within the predicted face region includes the steps of: setting a third comparison region within the predicted face region by translating the first region of similarity by a second step smaller than the first step; determining a third degree of similarity between the third comparison region and the first face region; determining that the third degree of similarity is greater than the first degree of similarity; and based on the determination that the third degree of similarity is greater than the first degree of similarity, determining the third comparison region to be the second region of similarity. This step may be similar to step S304 described in relation to FIG. 5. By stepping the comparison regions around the first region of similarity using a smaller step size, resolution of the face location tracking may be improved while reducing the computational burden relative to stepping the comparison regions at a smaller step size throughout the entire predicted face region.

At 1110, whether a second face region is present within the second image is determined. The presence of the second face region may be determined using algorithms described in relation to step 1102. For example, a face recognition algorithm or the Adaboost method may be performed on the second image. When the face recognition algorithm or the Adaboost method returns one or more face regions, a determination is made that the second face region is present within the second image. When the face recognition algorithm or the Adaboost method does not return a face region, a determination is made that the second face region is not present within the second image. This may be the case when there is a sudden change in lighting or scene, overexposure due to excessive lighting, an interference in exposure metering, or a rapid face movement causing distortion of the face. From 1110, method 1100 proceeds to 1112.

At 1112, the location of the face within the second image is determined based on (i) the first region of similarity, (ii) a determination of whether the second face region is present within the second image, and (iii) at least one selection rule. Examples of the at least one selection rule is describe in relation to FIG. 4. In some implementations, the at least one selection rule may include at least one of: based on a determination that the second face region in not present within the second image, determining the location of the face to be the first region of similarity; based on a determination that (i) the second face region is present within the second image, and (ii) a spatial overlap coefficient between the second face region and the first region of similarity is 0, determining the location of the face to be the first region of similarity; based on a determination that (i) the second face region is present within the second image, and (ii) a spatial overlap coefficient between the second face region and the first region of similarity is less than a preset threshold, determining the location of the face to be the first region of similarity; or based on a determination that (i) the second face region is present within the second image, and (ii) a spatial overlap coefficient between the second face region and the first region of similarity is greater than or equal to the preset threshold, determining the location of the face to be the second face region.

In some implementations where the second region of similarity has been determined, the location of the face within the second image is determined further based on the second region of similarity. For example, the second region of similarity may be used in place of the first region of similarity in the at least one selection rule. After 1112, method 1100 stops.

In various imaging scenarios, a temporary loss of face location tracking may occur in certain image frames. For example, an image frame may experience a sudden change in lighting or scene, an overexposure due to excessive lighting, an interference in exposure metering, or a rapid face movement causing a distortion of the face. In such scenarios, a face recognition algorithm may be unable to recognize a face, or may incorrectly identify a face, leading to a discontinuity in or an incorrect face location tracking result. The methods and techniques described herein may improve the continuity and reliability of face location tracking in presence of unfavorable face tracking conditions.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for tracking locations of a face across a plurality of images comprising a first image and a second image, the method comprising:
   determining a first face region within the first image, the first face region including a location of the face within the first image;
   based on the determined first face region within the first image, determining a predicted face region within the second image;
   calculating, for each comparison region in a plurality of comparison regions, a degree of similarity between the respective comparison region and the first face region;
   based on determining that a particular comparison region in the plurality of comparison regions has a higher degree of similarity to the first face region than corresponding degrees of similarity of the other comparison regions in the plurality of comparison regions, selecting the particular comparison region among the plurality of comparison regions as a first region of similarity;
   determining whether a second face region is present within the second image; and
   determining the location of the face within the second image based on the first region of similarity, the determination of whether the second face region is present within the second image,
   wherein calculating, for each comparison region in the plurality of comparison regions, the degree of similarity between the respective comparison region and the first face region comprises performing calculations according to the following equations:

$$\min X = \max(-left_{ori}, -left_{des})$$

$$\max X = \max(width - left_{ori}, width - left_{des})$$

$$\min Y = \max(-top_{ori}, -top_{des})$$

$$\max Y = \max(height - top_{ori}, height - top_{des})$$

$$SumDis = \left\{ \sum_{i=\max(1,\min X)}^{\min(width,\max X)} \sum_{j=\max(1,\min Y)}^{\min(height,\max X)} \min\{|f(i,j) - g(i,j)|, x\} \right\}$$

$$effctiveNum = [\min(width, \max X) - \max(1, \min X)] * [\min(height, \max X) - \max(1, \min Y)]$$

$$dis = sumDis * (width * height) / effctiveNum$$

wherein $left_{ori}$, $left_{des}$, $top_{ori}$, and $top_{des}$ respectively represent a left boundary location of the first face region, a left boundary location of the respective comparison region, an upper boundary location of the first face region, and an upper boundary location of the respective comparison region, wherein width represents a width of the first face region and height represents a height of the first face region, wherein f(i,j) represents a grayscale value of a pixel of the first image having coordinates (i,j) in the first face region of the first image and g(i,j) represents a grayscale value of a pixel of the second image having coordinates (i,j) in the respective comparison region of the second image, and wherein x represents a first preset threshold and dis is the degree of similarity between the first face region and the respective comparison region.

2. The computer-implemented method of claim 1, wherein setting a plurality of comparison regions within the predicted face region comprises:
   setting a first comparison region within the predicted face region; and
   repeatedly translating from the first comparison region by a first step to generate the plurality of comparison regions.

3. The computer-implemented method of claim 2, wherein the first step is two or more pixels of the second image.

4. The computer-implemented method of claim 2, wherein the first step is equal to 1% to 10% of a width or a height of the second image.

5. The computer-implemented method of claim 1, wherein setting a plurality of comparison regions within the predicted face region comprises:
   setting a first comparison region within the predicted face region; and
   setting a second comparison region within the predicted face region by translating the first comparison region by a first step, the first step being two or more pixels of the second image.

6. The computer-implemented method of claim 5, wherein setting a plurality of comparison regions within the predicted face region comprises:
   setting a third comparison region within the predicted face region by translating the first region of similarity by a second step smaller than the first step.

7. The computer-implemented method of claim 1, wherein setting a plurality of comparison regions within the predicted face region comprises dividing the predicted face region into a preset number of comparison regions.

8. The computer-implemented method of claim 1, wherein the determining of the location of the face within the second image is further based on a face region selection rule, wherein the face region selection rule specifies criteria for determining the location of the face within the second image, including at least one of:
   when the second face region is not present within the second image, the location of the face is the first region of similarity;
   when the second face region is present within the second image, and a spatial overlap coefficient between the second face region and the first region of similarity is 0, the location of the face is the first region of similarity;
   when the second face region is present within the second image, and a spatial overlap coefficient between the second face region and the first region of similarity is less than a second preset threshold, the location of the face is the first region of similarity; or
   when the second face region is present within the second image, and a spatial overlap coefficient between the second face region and the first region of similarity is greater than or equal to the second preset threshold, the location of the face is the second face region.

9. The computer-implemented method of claim 1, wherein determining a first face region within the first image comprises:
   determining that the first image comprises a plurality of faces;
   determining a plurality of face region areas; and
   determining a region comprising a face of the plurality of faces having the largest face region area to be the first face region.

10. A non-transitory, computer-readable medium storing one or more instructions executable by a computer system to perform operations comprising:
   determining a first face region within a first image, the first face region including a location of a face within the first image;
   based on the determined first face region within the first image, determining a predicted face region within a second image;
   calculating, for each comparison region in a plurality of comparison regions, a degree of similarity between the respective comparison region and the first face region;
   based on determining that a particular comparison region in the plurality of comparison regions has a higher degree of similarity to the first face region than corresponding degrees of similarity of the other comparison regions in the plurality of comparison regions, selecting the particular comparison region among the plurality of comparison regions as a first region of similarity;
   determining whether a second face region is present within the second image; and
   determining the location of the face within the second image based on the first region of similarity, the determination of whether the second face region is present within the second image,
   wherein calculating, for each comparison region in the plurality of comparison regions, the degree of similarity between the respective comparison region and the first face region comprises performing calculations according to the following equations:

$$\min X = \max(-left_{ori}, -left_{des})$$

$$\max X = \max(width - left_{ori}, width - left_{des})$$

$$\min Y = \max(-top_{ori}, -top_{des})$$

$$\max Y = \max(height - top_{ori}, height - top_{des})$$

$$SumDis = \left\{ \sum_{i=\max(1,\min X)}^{\min(width,\max X)} \sum_{j=\max(1,\min Y)}^{\min(height,\max X)} \min\{|f(i, j) - g(i, j)|, x\} \right\}$$

$$effctiveNum = [\min(width, \max X) - \max(1, \min X)] *$$
$$[\min(height, \max X) - \max(1, \min Y)]$$

$$dis = sumDis * (width * height) / effctiveNum$$

wherein $left_{ori}$, $left_{des}$, $top_{ori}$, and $top_{des}$ respectively represent a left boundary location of the first face region, a left boundary location of the respective comparison region, an upper boundary location of the first face region, and an upper boundary location of the respective comparison region,
   wherein width represents a width of the first face region and height represents a height of the first face region,
   wherein $f(i,j)$ represents a grayscale value of a pixel of the first image having coordinates (i,j) in the first face region of the first image and $g(i,j)$ represents a grayscale value of a pixel of the second image having coordinates (i,j) in the respective comparison region of the second image, and
   wherein x represents a first preset threshold and dis is the degree of similarity between the first face region and the respective comparison region.

11. The computer-readable medium of claim 10, wherein setting a plurality of comparison regions within the predicted face region comprises:
   setting a first comparison region within the predicted face region; and
   repeatedly translating from the first comparison region by a first step to generate the plurality of comparison regions.

12. The computer-readable medium of claim 11, wherein the first step is two or more pixels of the second image.

13. The computer-readable medium of claim 10, wherein setting a plurality of comparison regions within the predicted face region comprises:
   setting a first comparison region within the predicted face region; and
   setting a second comparison region within the predicted face region by translating the first comparison region by a first step, the first step being two or more pixels of the second image.

14. The computer-readable medium of claim 13, wherein setting a plurality of comparison regions within the predicted face region comprises:
   setting a third comparison region within the predicted face region by translating the first region of similarity by a second step smaller than the first step.

15. The computer-readable medium of claim 10, wherein the determining of the location of the face within the second image is further based on a face region selection rule, wherein the face region selection rule specifies criteria for determining the location of the face within the second image, including at least one of:
   when the second face region is not present within the second image, the location of the face is the first region of similarity;
   when the second face region is present within the second image, and a spatial overlap coefficient between the second face region and the first region of similarity is 0, the location of the face is the first region of similarity;
   when the second face region is present within the second image, and a spatial overlap coefficient between the second face region and the first region of similarity is less than a second preset threshold, the location of the face is the first region of similarity; or
   when the second face region is present within the second image, and a spatial overlap coefficient between the second face region and the first region of similarity is greater than or equal to the second preset threshold, the location of the face is the second face region.

16. The computer-readable medium of claim 10, wherein determining a first face region within the first image comprises:
   determining that the first image comprises a plurality of faces;
   determining a plurality of face region areas; and
   determining a region comprising a face of the plurality of faces having the largest face region area to be the first face region.

17. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
   determining a first face region within a first image, the first face region including a location of a face within the first image;
   based on the determined first face region within the first image, determining a predicted face region within a second image;
   calculating, for each comparison region in a plurality of comparison regions, a degree of similarity between the respective comparison region and the first face region;
   based on determining that a particular comparison region in the plurality of comparison regions has a higher degree of similarity to the first face region than corresponding degrees of similarity of the other comparison regions in the plurality of comparison regions, selecting the particular comparison region among the plurality of comparison regions as a first region of similarity;
   determining whether a second face region is present within the second image; and
   determining the location of the face within the second image based on the first region of similarity, the determination of whether the second face region is present within the second image,
   wherein calculating, for each comparison region in the plurality of comparison regions, the degree of similarity between the respective comparison region and the first face region comprises performing calculations according to the following equations:

$$\min X = \max(-left_{ori}, -left_{des})$$

$$\max X = \max(\text{width} - left_{ori}, \text{width} - left_{des})$$

$$\min Y = \max(-top_{ori}, -top_{des})$$

$$\max Y = \max(\text{height} - top_{ori}, \text{height} - top_{des})$$

$$SumDis = \left\{ \sum_{i=\max(1,\min X)}^{\min(\text{width},\max X)} \sum_{j=\max(1,\min Y)}^{\min(\text{height},\max X)} \min\{|f(i,j) - g(i,j)|, x\} \right\}$$

$$effctiveNum = [\min(\text{width}, \max X) - \max(1, \min X)] * [\min(\text{height}, \max X) - \max(1, \min Y)]$$

$$dis = sumDis * (\text{width} * \text{height}) / effctiveNum$$

wherein $left_{ori}$, $left_{des}$, $top_{ori}$, and $top_{des}$ respectively represent a left boundary location of the first face region, a left boundary location of the respective comparison region, an upper boundary location of the first face region, and an upper boundary location of the respective comparison region,
   wherein width represents a width of the first face region and height represents a height of the first face region,
   wherein $f(i,j)$ represents a grayscale value of a pixel of the first image having coordinates $(i,j)$ in the first face region of the first image and $g(i,j)$ represents a grayscale value of a pixel of the second image having coordinates $(i,j)$ in the respective comparison region of the second image, and
   wherein x represents a first preset threshold and dis is the degree of similarity between the first face region and the respective comparison region.

18. A computer-implemented system of claim 17, wherein the determining of the location of the face within the second image is further based on a face region selection rule, wherein the face region selection rule specifies criteria for determining the location of the face within the second image, including at least one of:
   when the second face region is not present within the second image, the location of the face is the first region of similarity;
   when the second face region is present within the second image, and a spatial overlap coefficient between the second face region and the first region of similarity is 0, the location of the face is the first region of similarity;
   when the second face region is present within the second image, and a spatial overlap coefficient between the second face region and the first region of similarity is less than a second preset threshold, the location of the face is the first region of similarity; or
   when the second face region is present within the second image, and a spatial overlap coefficient between the second face region and the first region of similarity is greater than or equal to the second preset threshold, the location of the face is the second face region.

* * * * *